United States Patent
Kim et al.

(10) Patent No.: US 7,353,341 B2
(45) Date of Patent: Apr. 1, 2008

(54) SYSTEM AND METHOD FOR CANCELING WRITE BACK OPERATION DURING SIMULTANEOUS SNOOP PUSH OR SNOOP KILL OPERATION IN WRITE BACK CACHES

(75) Inventors: Roy Moonseuk Kim, Austin, TX (US); Yasukichi Okawa, Kawasaki (JP); Thuong Quang Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 10/860,426

(22) Filed: Jun. 3, 2004

(65) Prior Publication Data

US 2005/0273563 A1 Dec. 8, 2005

(51) Int. Cl.
*G06F 12/00* (2006.01)
*G06F 13/00* (2006.01)
*G06F 13/28* (2006.01)

(52) U.S. Cl. .................. 711/146; 711/133; 711/134; 711/135; 711/143; 711/144

(58) Field of Classification Search ............ 711/133, 711/134, 135, 143, 144, 146
See application file for complete search history.

(56) References Cited

U.S. PATENT DOCUMENTS

| | | | | |
|---|---|---|---|---|
| 5,684,977 A | * | 11/1997 | Van Loo et al. | 711/143 |
| 5,829,027 A | * | 10/1998 | Goodrum | 711/122 |
| 5,829,033 A | * | 10/1998 | Hagersten et al. | 711/141 |
| 5,905,998 A | * | 5/1999 | Ebrahim et al. | 711/144 |
| 6,275,907 B1 | * | 8/2001 | Baumgartner et al. | 711/143 |
| 6,349,367 B1 | * | 2/2002 | Arimilli et al. | 711/143 |
| 6,502,171 B1 | | 12/2002 | Arimilli et al. | |

* cited by examiner

*Primary Examiner*—Sanjiv Shah
*Assistant Examiner*—Yaima Campos
(74) *Attorney, Agent, or Firm*—Carr LLP; D'Ann N. Rafai

(57) ABSTRACT

A cache write back operation, write back modified data to memory from cache data array to fix inconsistency between them can be cancelled by the results of a comparison of the progress between a write back and snoop push or snoop kill operation. Write back is intended to make an empty slot to accommodate a reload data due to a cache miss and since a snoop push or snoop kill operation creates an invalid entry in the cache, write back is not needed. If simultaneous push or kill with write back operation exist, then write back machine is late cancelled. System performance improves due to preserving more cache lines in cache data array for possible future reuse.

18 Claims, 6 Drawing Sheets

SYSTEM AND METHOD FOR CANCELING WRITE BACK OPERATION DURING SIMULTANEOUS SNOOP PUSH OR SNOOP KILL OPERATION IN WRITE BACK CACHES

TECHNICAL FIELD

The present invention relates generally to the field of computer systems and, more particularly, cache systems in microprocessors.

BACKGROUND

High performance processing systems require fast memory access and low memory latency, for quickly processing data. Since system memory is slow to provide data to the processor, caches are designed to provide a way to keep data close to the processor with quicker access time for its data. Larger caches give better system performance overall but inadvertently can induce more latency and design complexities compared to smaller caches. Usually smaller caches are designed to provide a fast way for a processor to synchronize or communicate to other processors in system applications level, especially in networking or graphics environment.

Processors retrieve data to and from memory, via Loads and Stores. Data from system memory fill up the cache in time. The optimum condition is where most or all of processor accessing data is in cache. This could happen if an application data size is same or smaller than the cache size. In general, cache size is usually limited by design or technology and cannot contain the whole application data. This is becoming a problem when the processor accessing the new data that is not in the cache and no cache space is available to put the new data. Hence, the cache controller needs to find an appropriate space in the cache for the new data when it arrives from memory. LRU (Least Recently Used) algorithm is used in cache controller to handle this situation. LRU determines which location is to be used for the new data based on the data access history. If LRU selects a line that is consistent with the system memory, e.g. shared state, then the new data will be over written to that location. When LRU selects a line that is marked 'Modified', which means that data is not consistent with the system memory and unique, cache controller forces the 'Modified' data of this location to be written back to the system memory. This action is called 'write back' or 'castout', and the cache location that contains the write back data is called 'Victim Cache Line'.

In a typical cache design, the LRU algorithm is used to best estimate the future data reuse by the software via removing the least recently used data. However, LRU may make an incorrect selection and that can cause a future cache miss on the same data. This then requires another long latency reload from main memory for the missed data.

In addition to this long latency write back and reload, another situation can cause performance degradation. A cache controller attempts to complete the write back operation expediently, by sending the data to the system memory via designated bus operations. During the write back operation, bus snoop operation comes in with its address matches to the write back address; the snoop operation will be retried. In another words, until the write back data is in the system memory, all subsequent snoops' hits on the same write back data will be retried. Snoop operation is necessary on the system bus to maintain memory coherency between multi-processor cache and system memory.

Since the write back operation is a long latency bus operation, all snoop operations hitting on write back address will be retried. This creates problems on system performance and sometimes may create a live-lock situation. Hence, by avoiding this long latency write back operation as much as possible, better the system performance will be.

An exemplary write back cache is implemented to provide a fast way for processors to access data, communicate, and synchronize between tasks with optimum performance. Even though the amount of data in and out of this cache is small, a mechanism to cancel write back operation whenever possible is needed for better performance. There are two types of operations that create an empty space in cache, either a 'snoop push' or a 'snoop kill'. One example of snoop push operation results from a store from another bus agent without a cache, for e.g. IO controller on the system bus, on a modified cache hit data. Cache controller will retry this IO controller store request on the bus and the latest copy of modified data will be pushed out to memory so that IO controller can update on the latest modified data to memory. Snoop push operation pushes out modified data to system memory and keeps the data as shared or invalid. Snoop kill operation, for example, as in cache flush, invalidates an entry, which creates a room in cache for subsequent cache miss reload. Therefore, since an empty space is created by either a snoop push or a snoop kill operation, the write back is not necessary for a concurrent cache miss reload.

System performance is improved with this mechanism since the cancelled Write back in turn eliminate subsequent possible cache misses and the snoop retries that could have hit on the victim during write back. In addition, canceling long latency bus operations like Write back puts less strain on the bus especially when a snoop push operation is occurring at the same time. Therefore, it is desirable, to be able to cancel a pending write back operation if the snoop state machine is busy doing a snoop push or snoop kill.

SUMMARY OF THE INVENTION

The present invention provides for performing late cancellation of a write back operation in a cache system. A write back cache is connected to lower hierarchy storage via a system bus. Reload operation from a cache miss transfers data from lower or same hierarchy storage to the cache. Write back operation transfers data from cache to lower hierarchy storage. A valid victim is identified, the progress state of a snoop push or snoop kill is determined and verification of a write back cycle in progress is made. The stage of development and initiation of a late cancel of the write back based on an outcome response to concurrent snoop kill or snoop push and write back operations is determined.

BRIEF DESCRIPTION OF THE DRAWINGS

For a more complete understanding of the present invention, and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

In the remainder of this description, an exemplary cache may be a sole cache of digital logical operations for preventing write back operations while snoop pushes or snoop kills are underway in a device. The exemplary cache may also be one of many processing units that share the processing of data according to some methodology or algorithm developed for a given computational device. It is further noted that, unless indicated otherwise, all functions described herein may be performed in either hardware or software, or some combination thereof. In a preferred embodiment, however, the functions are performed in a hardware cache digital device. The movement of discrete data is in accordance with code, such as computer program code, software, and/or integrated circuits that are coded to perform such functions, unless indicated otherwise.

Figure 1:
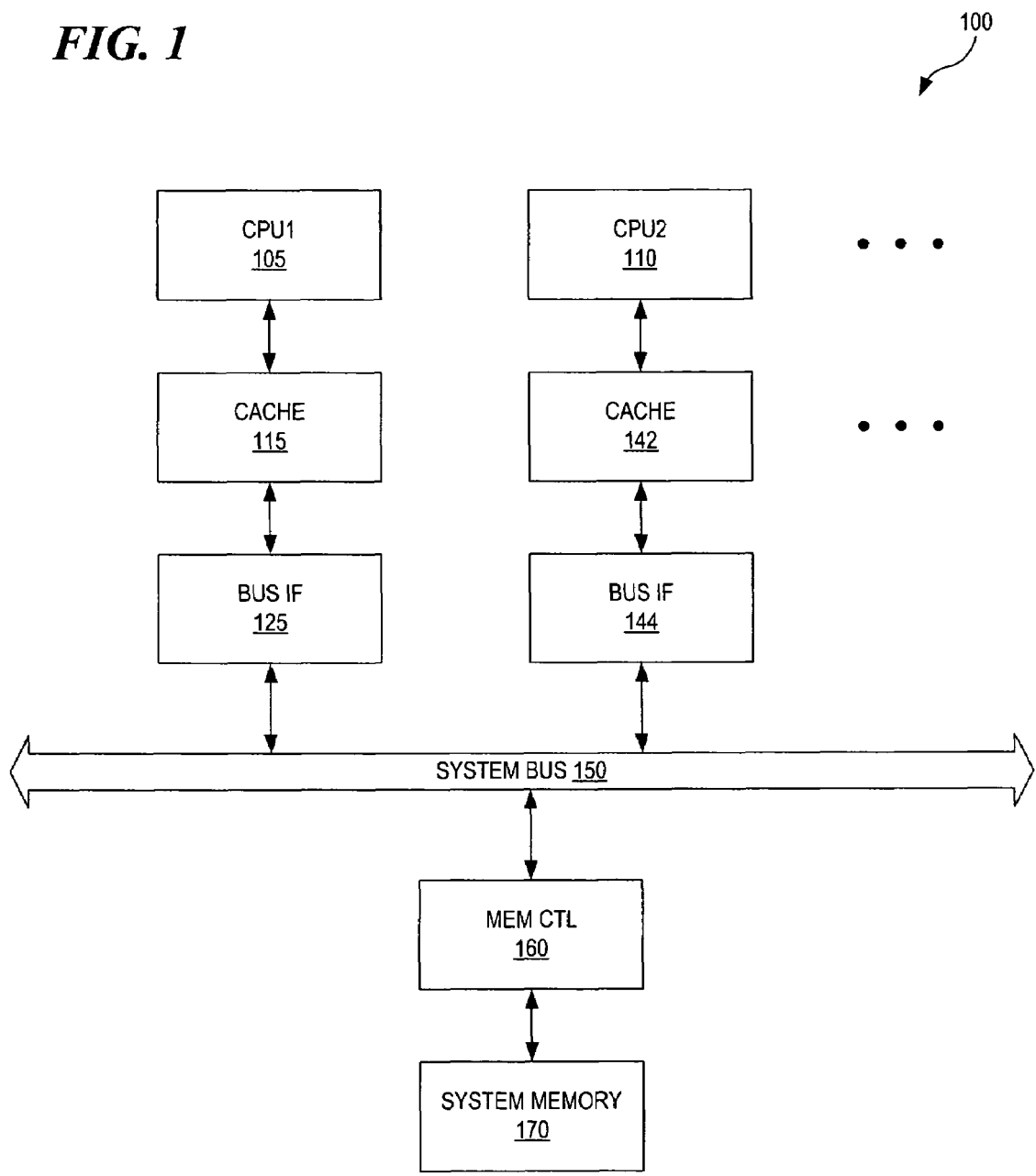
FIG. 1 depicts, in block diagram form, a typical multi-processing computing system that shows how processing units, cache units and bus interface units work in series and in parallel, and where the present invention can be employed.

Turning to FIG. 1, disclosed is an exemplary multiprocessor SYSTEM 100 block diagram illustrating a plurality of processors, caches and inter-operational subsystems.

Those skilled in the art will appreciate the interrelation and complexity of the subsystems, comprising processors, system bus, memory controller, memory bus, main memory module, caches, and so forth. The entire system relies on the correct timing, placement, and replacement of data in and out of memory devices. The data may simultaneously be in transit or in storage. Dynamic storage in a processor most often occurs in a cache. Within the cache is usually contained a dedicated directory with a port dedicated to snooping. Snooping is the process whereby slave caches watch the system bus and compare the transferred address to addresses in the cache directory. Additional operations can be performed in the case that a match is found. The terms bus snooping or bus watching are equivalent.

FIG. 1 presents a view of an exemplary multi-processor system with generalized central processors units CPU1 105 and CPU2 110 that may include instruction units, instruction caches, data caches, fixed-point units, floating points and local storages, for example. Processors CPU1 105 and CPU2 110 either couple through a bus or enclose lower level caches, such as those represented by CACHE 115 and CACHE 142. CACHE 115 and CACHE 142 couple to Bus Interface units BusIF 125 and BusIF 144, which in turn couple to the common System Bus 150. Other processors' caches can couple to the System Bus 150 via additional bus interface units in order to have inter-processor communications. In addition to 'n' processors, a memory controller, MEM CTL 160 couples to the System Bus 150. A System Memory 170 couples to MEM CTL 160 for common storage shared by processors CPU1 105 and CPU2 110, and this is true for any number of 'n' processors in a system.

Figure 2:
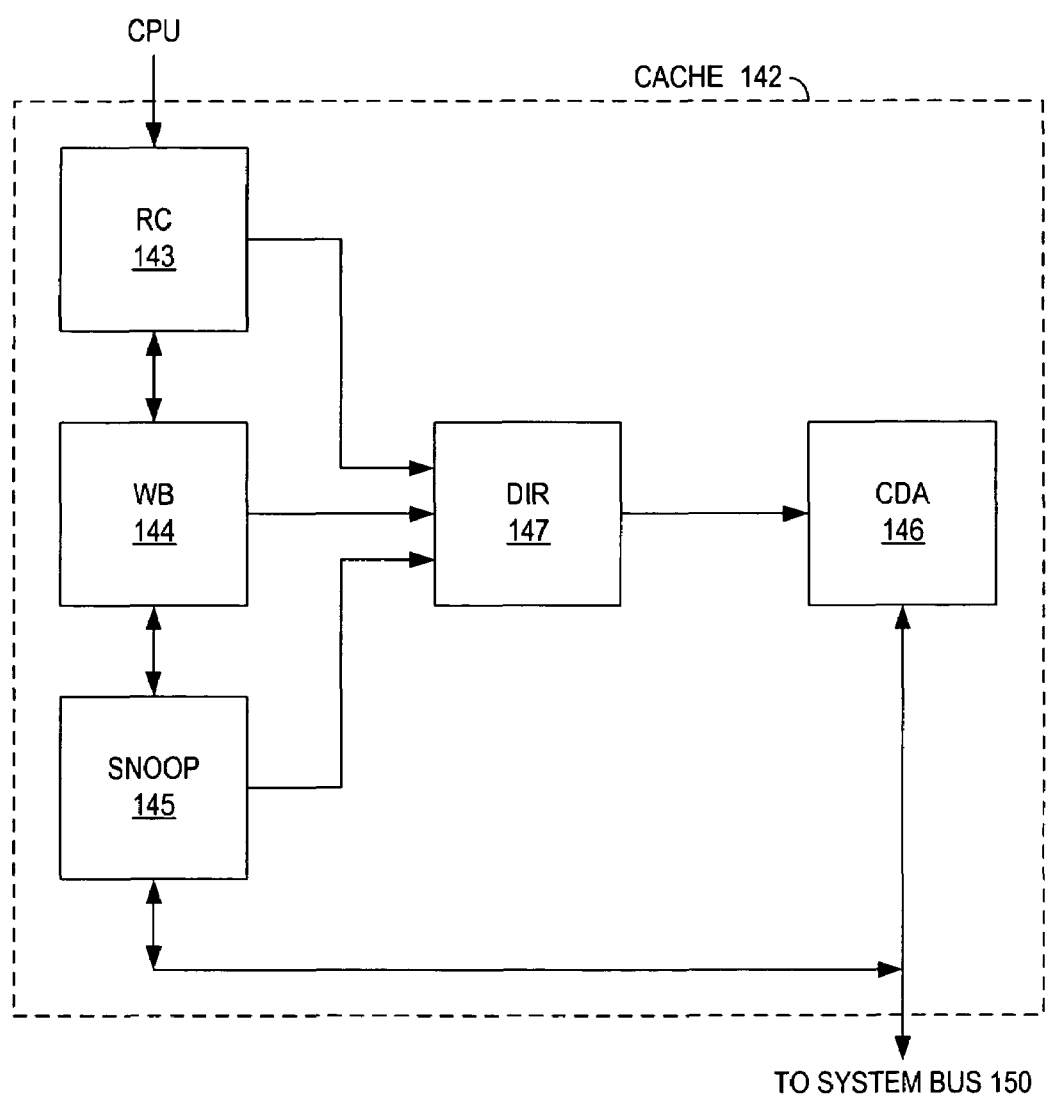
FIG. 2 illustrates the basic block diagram of the exemplary write back cache system.

Turning then to FIG. 2, the view of the system 100 is magnified to inspect the location of the representative CACHE 142 from FIG. 1. CACHE 142 includes data array circuitry (CDA), CDA 146 for data storage and its control logic. Control logic includes a directory DIR 147, 'Read and Claim' finite state machine RC 143, to handle cacheable storage accesses from processor core, WB 144 (write back) state machine to handle write back of data to memory and Snoop state machine Snoop 145. Directory 147 holds the cache data tags and cache data states.

The RC 143 machine executes cacheable storage access instructions. This includes: lock acquisition or atomic instructions called up, load and reserve, store conditional and instructions for inter process synchronization. The purpose of this series of instructions is to synchronize operations between processors by giving ownership of common data to a processor, in orderly fashion, in multi-processor systems. The purpose, generally, of this series of instructions, is to synchronize operations between processors by giving ownership of the data to one processor at a time in multi-processor system.

The WB 144 machine handles write back for the RC 143 machine when cache miss occur for one of above instructions and when CACHE 142 is full, and victim entry is modified state.

The Snoop machine (Snoop) 145 handles snoop operations coming from the System Bus 150 to maintain memory coherency throughout the system.

Figure 3:
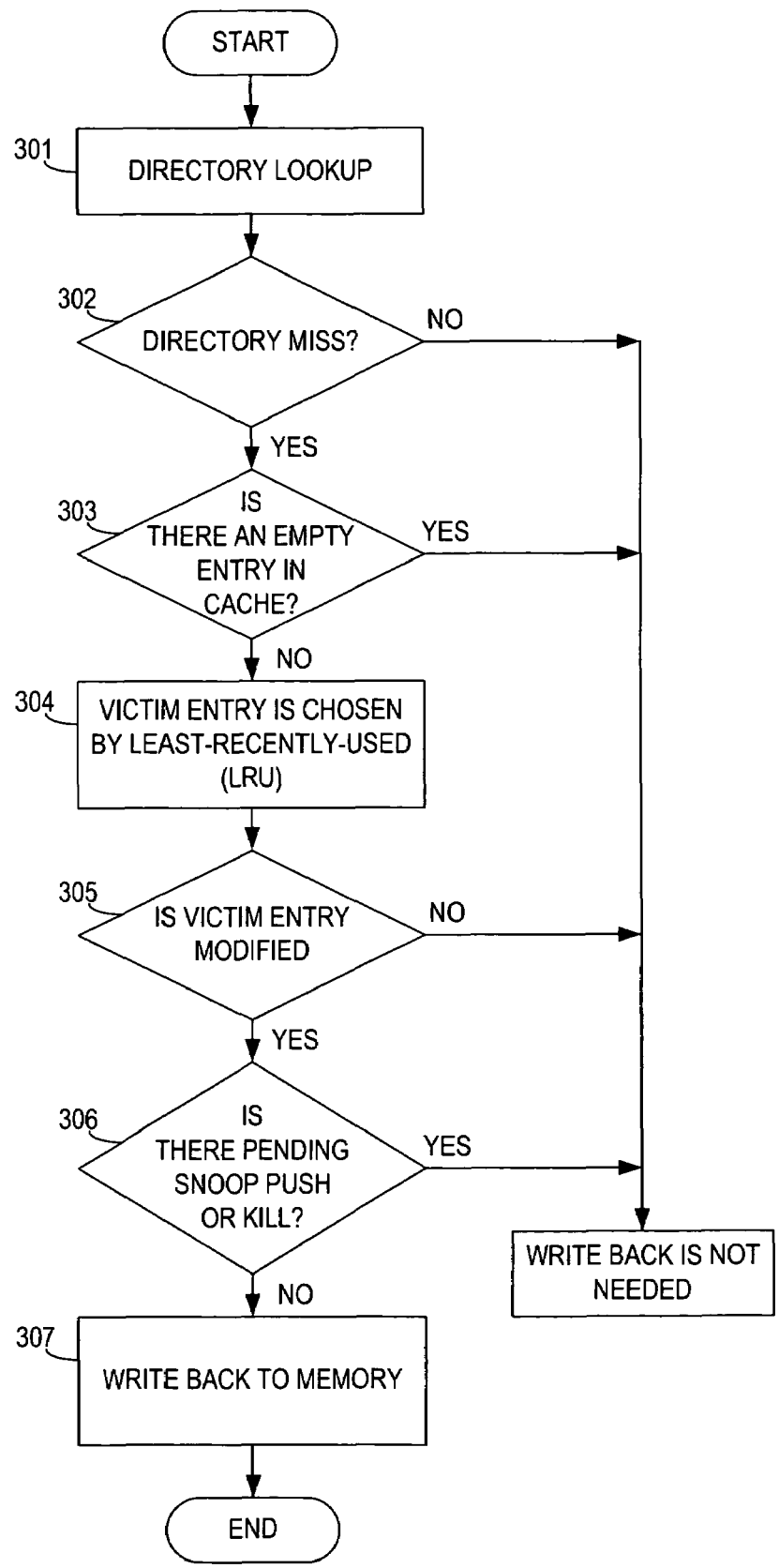
FIG. 3 depicts a flow chart of write back operation.

FIG. 3 illustrates a write back operation in a flow chart diagram for an exemplary embodiment of the present invention. This flowchart describes decision making process on write back, whether it is needed or not. Generally, this example implementation is such that the Cache (142) has only one write back (WB 144) machine. A write back request is dispatched by a 'read and claim' (RC 143) machine when cacheable storage access instructions are executed RC 143 misses on DIR 147 (Directory) lookup and there is no room in the Cache 142. RC 143 dispatches WB 144 machine right after DIR 147 Directory Lookup 301 and found a miss with no empty space (Directory Miss 302 and Empty Entry 303) in Cache Data Array 146. If the designated least-recently-used Victim Entry 304 is modified, WB 144 has to write the Entry Modified Line 305 back to memory in order to make a room in Cache 142.

Next, WB 144 state machine checks for Pending Snoop 306. WB 144 checks for a write back late cancel development. This condition occurs when the snoop machine is busy handling snoop push invalidate or snoop kill operation. When WB 144 late cancel is active, the WB 144 machine goes to the idle state since write back is an extraneous function. If the WB 144 late cancel is not active, WB 144 machine continues with storing the victim entry to the memory to complete the write back operation at 307.

Figure 4:
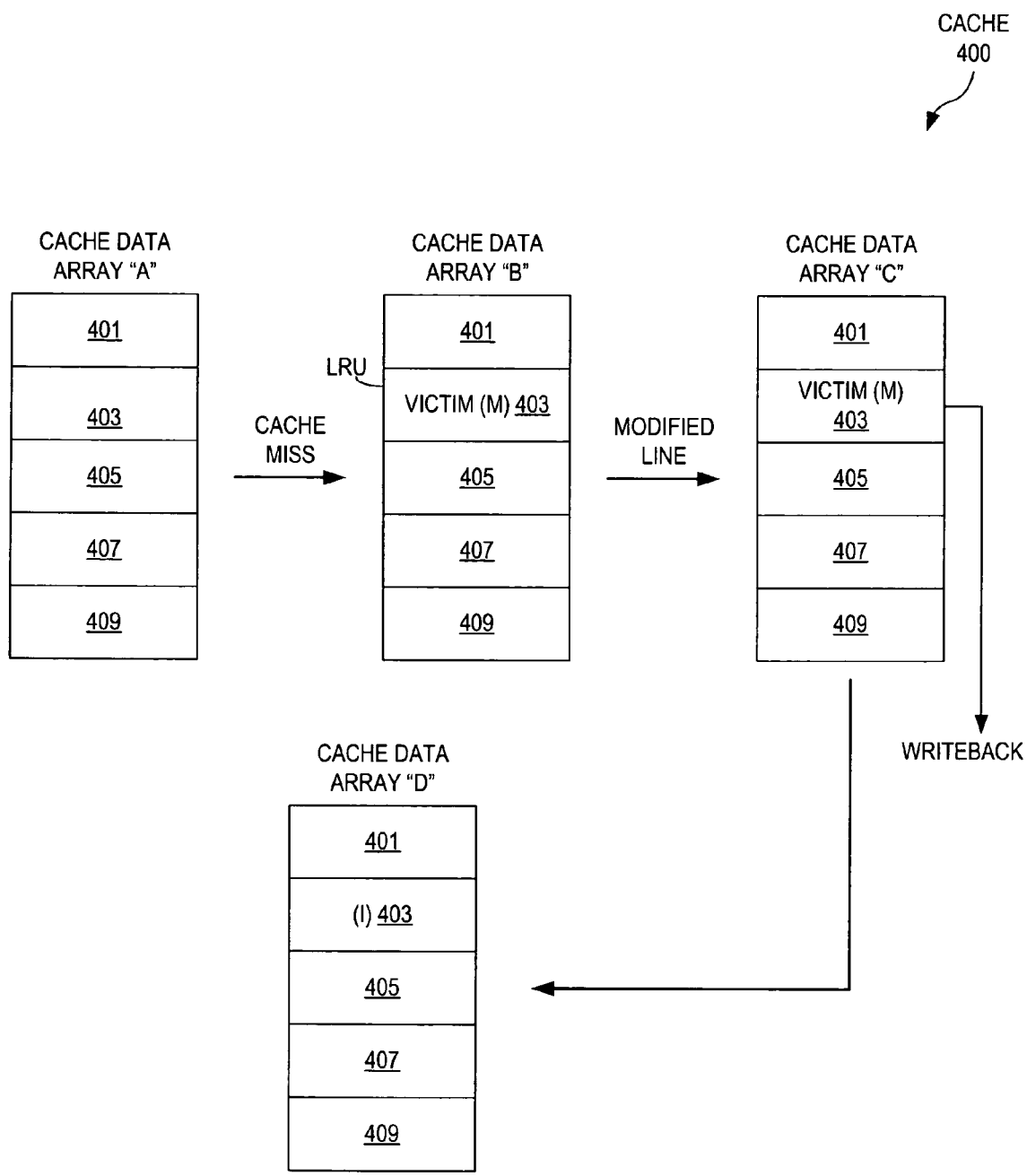
FIG. 4 details the cacheline flow of a write back operation on a cache miss.

Turning to FIG. 4, disclosed is an exemplary five-line cache 400. FIG. 4 illustrates cache management of write back where a victim line writes back due to a cache miss.

The first operation of Cache 142 occurs at column "A," displaying the initial state of the Cache 400.

A cache miss is a request to read from the cache that is unsatisfied, requiring the program to request a data reload from lower storage or horizontal cache. Because of the miss, a victim entry evicts by a write back command to the lower storage if there is no room for reload data, and if the victim entry is modified. A modified line is the result of a modification of a data for which there is no copy anywhere in the system. In other words, it is an invalid match between the present cache and the entry retrieved from a main memory location.

LRU algorithm can be used to select a victim entry for write back that is the most unlikely accessed data in subsequent load or store operations. A victim pointer is used to write back a modified entry when there is a miss from a cacheable storage access instruction, but all of the entries in the atomic cache are still valid.

For illustrative purposes exclusively, there is a presumption that five entries are filled with valid cacheable storage data. The RC 143 machine dispatches the WB 144 machine to write back a victim line due to a cache miss on cacheable storage access instruction execution. In cache data array 400 column "B," LRU chooses the victim line, which is modified, that needs a write back. In cache data array 400 column "C," the victim line is sent to the system memory. After the write back, the victim line is invalidated and is made available for the reload.

Least-recently-used register (LRU) chooses one victim entry 403 (the LRU is logic circuitry that constantly analyzes cache access history and determines which line is the least recently used entry). Then, the WB machine removes the least used data line to free the line for a new entry. This new entry is used for the cache miss reload. Therefore, unless the victim line 403 is in a shared state, the write back machine works to write back and invalidate each victim entry. At the final operation, the victim line 403 is used for the reload of next cache miss.

In FIG. 4, those of ordinary skill in the art understand that a distinction is made between the entry and exit of valid and invalid entries in a cache data array. The instant illustration is only one example of the location of the victim line 403 in the Cache Data Array 400. Additional embodiments can include a plurality of cache operating in parallel or in series within a single processor, or in and between pluralities of co-processors.

Furthermore, this is only one embodiment of several combinatorial arrangements. The cache is not limited to a five-line cache system. However, when the number of fixed elements is increased, the size of the matrix will increase and so will the total number of combinatorial possibilities, leading to increased latency.

Figure 5:
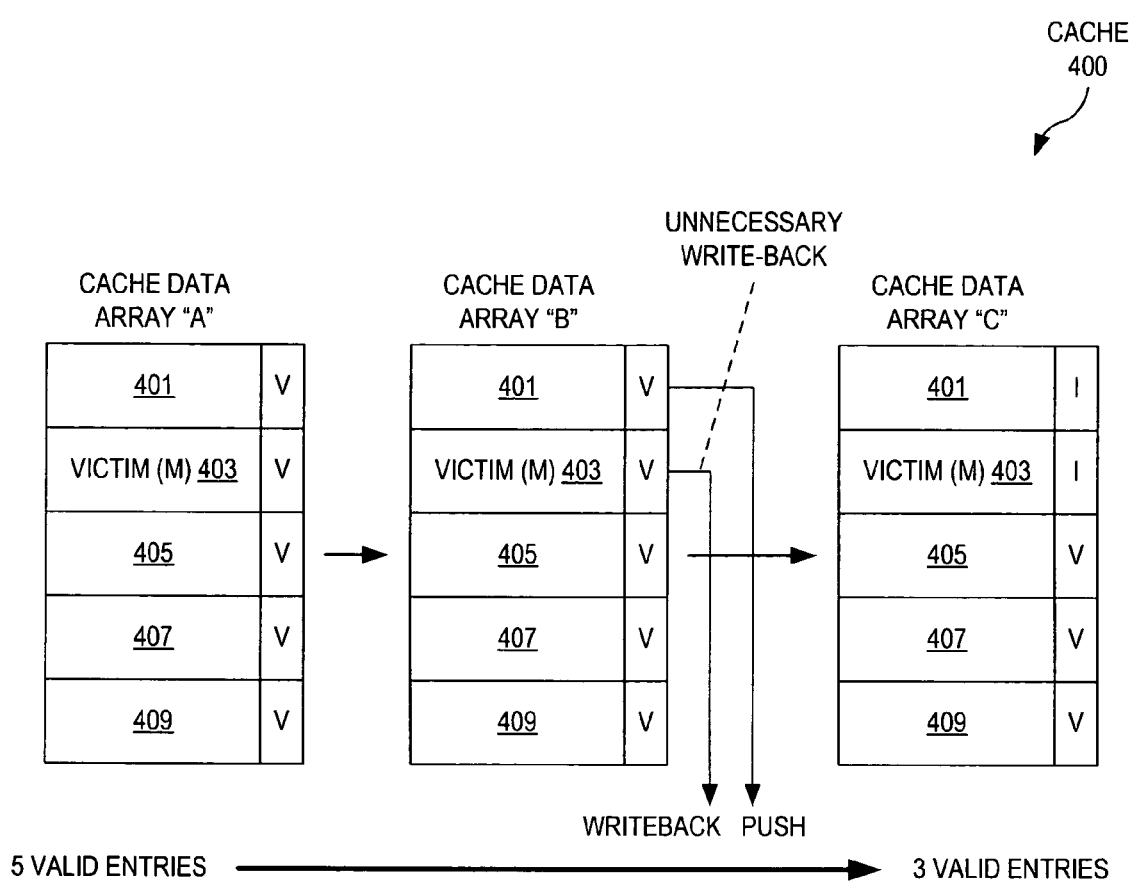
FIG. 5 details the cacheline flow of a write back and snoop push operations in a cache.

FIG. 5 continues the view of an embodiment of the Cache 400 data array schema. When write back and snoop push or snoop kill operations occur at the same time on different entries of Cache Data Array—CDA 400, write back is not necessary since the snoop push or snoop kill will create an invalid entry. This is very important in the CDA 400, since CDA 400 has only five entries available for the cacheable storage access operations (as previously discussed in FIG. 4). If both write back and snoop push are allowed to happen at the same time, then two of five entries will get invalidated and seriously degrade performance.

In order to solve this problem, late cancel logic adds into WB 144 to cancel the pending write back if the snoop machine is busy doing a snoop push or snoop kill. As shown in CDA 400 column "C," if write back remains uncancelled, it leaves two invalid entries after the write back. Therefore, this write back was not necessary because the clearance action of snoop push or snoop kill already cleared a line. When a snoop kill or snoop push is received and the valid victim 403 line is written back to memory for cache miss which leaves 2 invalid entries. WB 144 has a mechanism to detect simultaneous snoop push or kill operations in the process of execution. If the state machine detects a snoop push or kill, the pending write back is 'late cancelled'.

Figure 6:
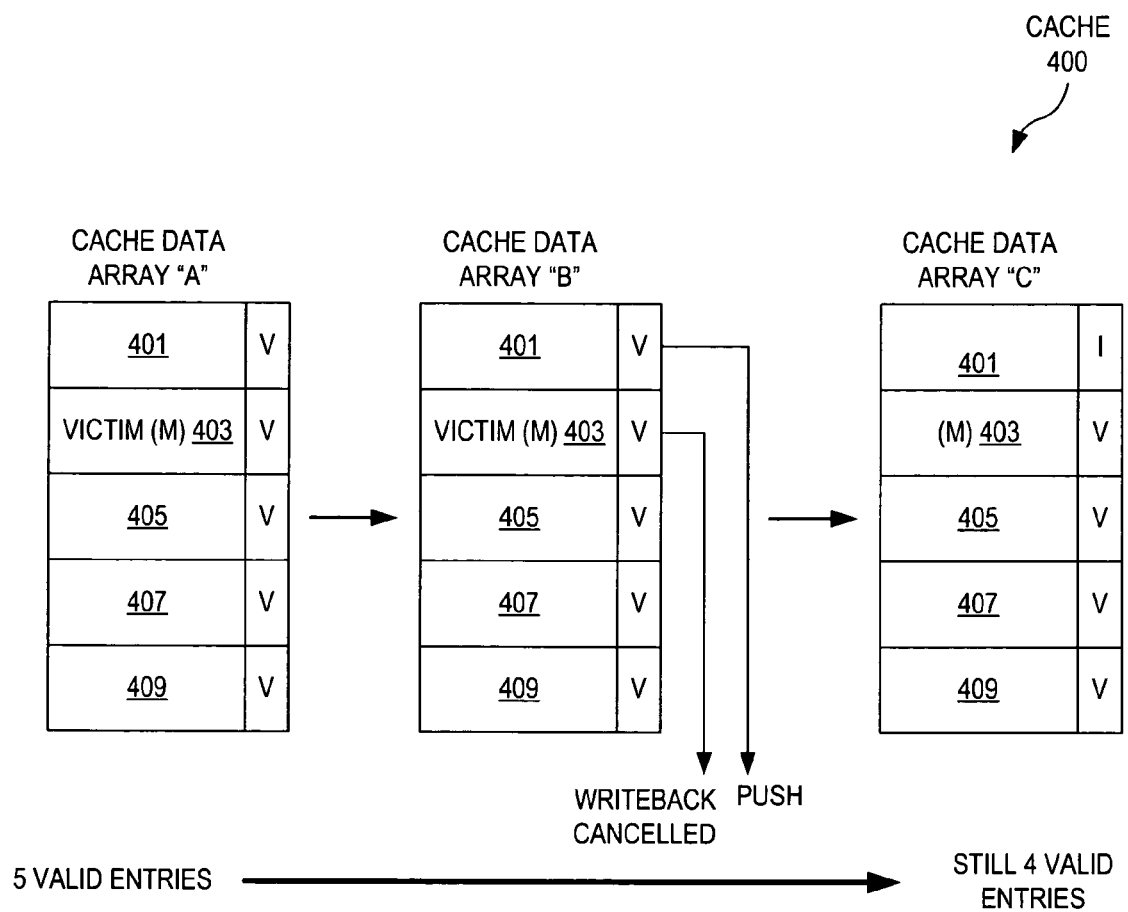
FIG. 6 illustrates the final cache data array operation of a write back late cancel by snoop pushes or snoop kills operation.

FIG. 6 represents the final Cache 142 (and in this example, similarly, Cache 115, or any number of 'n' processors) cache states. Due to the WB 144 late cancel, write back does not occur and reserves the four valid lines in the Cache Data Array 400. Then it waits for the reload of data, which was the snoop push or snoop kill entry. Clearly, the four out of five entries are still valid at the end of the WB 144 state machine, which is the expected and desired result.

Having thus described the present invention by reference to certain of its embodiments, it is noted that the embodiments disclosed are illustrative rather than limiting in nature. A wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of these embodiments. Accordingly, it is appropriate that the appended claims be construed broadly and in a manner consistent with the scope of the invention.

The invention claimed is:

1. A cache memory, comprising:
   a data array configured to store data, and comprising at least a first cache line and a second cache line;
   read and claim logic adapted to receive a memory access request;
   snoop logic adapted for coupling to a system bus and configured to handle a snoop operation transmitted via the system bus;
   write back logic coupled to the read and claim logic and to the snoop logic;
   a directory coupled to the data array, the read and claim logic, the write back logic, and the snoop logic, wherein the directory is configured to store information regarding data stored in the data array;
   wherein the read and claim logic is configured to issue a write back request to the write back logic in the event data specified by the memory access request is not stored in the first cache line of the data array and there is no room in the data array;
   wherein the write back logic is farther configured to determine whether there is a pending snoop operation on the first cache line, in the event the read and claim logic issues a write back request;
   wherein the write back logic is further configured to cancel the write back request, in the event there is a pending snoop on the first cache line;
   wherein the write back logic is further configured to determine whether there is a pending snoop operation on at least the second cache line, in the event the read and claim logic issues a write back request; and
   wherein the write back logic is further configured to cancel the write back request, in the event there is a pending snoop on the second cache line.

2. The cache memory as recited in claim 1, wherein write back operation involves writing selected data stored in the data array to a system memory.

3. The cache memory as recited in claim 1, wherein the snoop push operation creates room in the data array for storing data.

4. The cache memory as recited in claim 1, wherein the snoop kill operation creates room in the data array for storing data.

5. The cache memory as recited in claim 1, wherein the snoop push operation causes data stored in the data array to be written to a system memory.

6. The cache memory as recited in claim 1, wherein the snoop kill operation invalidates data stored in the data array.

7. A method for improving cache performance in a cache memory comprising a plurality of cache lines comprising at least a first cache line and a second cache line, the method comprising:
- receiving a read request comprising requested data;
- determining whether the requested data is stored in the cache memory;
- in the event that the requested data is not stored in the cache memory, determining whether the cache memory is full;
- in the event that the cache memory is full, selecting the first cache line as a victim cache line from among the plurality of cache lines;
- determining whether the first cache line is modified;
- in the event the first cache line is modified, determining whether a write back is required;
- in the event a write back is required, determining whether there is a pending snoop operation on the first cache line;
- in the event there is a pending snoop on the first cache line, cancelling the required write back;
- in the event a write back is required, determining whether there is a pending snoop operation on at least the second cache line; and
- in the event there is a pending snoop on the second cache line, cancelling the required write back.

8. The method of claim 7, farther comprising:
- in the event a write back is required, determining whether there is a pending snoop operation on any of the plurality of cache lines, except the first cache line and the second cache line; and
- in the event there is a pending snoop on any of the plurality of cache lines, except the first cache line and the second cache line, cancelling the required write back.

9. The method as recited in claim 7, wherein the snoop operation is a snoop push operation that creates room in the data array for storing data.

10. The method as recited in claim 7, wherein the snoop operation is a snoop kill operation that creates room in the data array for storing data.

11. The method as recited in claim 7, wherein the snoop operation is a snoop push operation that causes data stored in the data array to be written to a system memory.

12. The method as recited in claim 7, wherein the snoop operation is a snoop kill operation that invalidates data stored in the data array.

13. A computer program product for improving cache performance in a cache memory comprising a plurality of cache lines comprising at least a first cache line and a second cache line, the computer program product having a computer-readable storage medium with a computer program embodied thereon, the computer program comprising: computer program code for receiving a read request comprising requested data; computer program code for determining whether the requested data is stored in the cache memory; computer program code for, in the event that the requested data is not stored in the cache memory, determining whether the cache memory is full; computer program code for, in the event that the cache memory is full, selecting the first cache line as a victim cache line from among the plurality of cache lines; computer program code for determining whether the first cache line is modified; computer program code for, in the event the first cache line is modified, determining whether a write back is required; computer program code for, in the event a write back is required, determining whether there is a pending snoop operation on the first cache line;
- computer program code for, in the event there is a pending snoop on the first cache line, cancelling the required write back; computer program code for, in the event a write back is required, determining whether there is a pending snoop operation on at least the second cache line;, and computer program code for, in the event there is a pending snoop on the second cache line, cancelling the required write back.

14. The computer program as recited in claim 13, further comprising:
- computer program code for, in the event a write back is required, determining whether there is a pending snoop operation on any of the plurality of cache lines, except the first cache line and the second cache line; and
- computer program code for, in the event there is a pending snoop on any of the plurality of cache lines, except the first cache line and the second cache line, cancelling the required write back.

15. The computer program product as recited in claim 13, wherein the snoop operation is a snoop push operation that creates room in the data array for storing data.

16. The computer program product as recited in claim 13, wherein the snoop operation is a snoop kill operation that creates room in the data array for storing data.

17. The computer program product as recited in claim 13, wherein the snoop operation is a snoop push operation that causes data stored in the data array to be written to a system memory.

18. The computer program product as recited in claim 13, wherein the snoop operation is a snoop kill operation that invalidates data stored in the data array.

* * * * *